(12) United States Patent
Fujiwara et al.

(10) Patent No.: US 8,430,020 B2
(45) Date of Patent: Apr. 30, 2013

(54) METHOD FOR SURFACE TREATMENT OF A SKIRT PORTION OF A PISTON FOR AN INTERNAL COMBUSTION ENGINE AND A PISTON FOR AN INTERNAL COMBUSTION ENGINE

(75) Inventors: Nobuyuki Fujiwara, Ueda (JP); Hiroshi Narusawa, Ueda (JP); Tsutomu Sakai, Ueda (JP); Yoshio Miyasaka, Nagoya (JP)

(73) Assignees: Art Metal Mfg Co., Ltd., Ueda-shi, Nagano (JP); Fuji Kihan Co., Ltd., Nagoya-shi, Aichi (JP)

( * ) Notice: Subject to any disclaimer, the term of this patent is extended or adjusted under 35 U.S.C. 154(b) by 875 days.

(21) Appl. No.: 12/575,206

(22) Filed: Oct. 7, 2009

(65) Prior Publication Data

US 2010/0083827 A1 Apr. 8, 2010

(30) Foreign Application Priority Data

Oct. 8, 2008 (JP) ................................. 2008-261865

(51) Int. Cl.
*F16J 1/04* (2006.01)
*B23P 15/10* (2006.01)

(52) U.S. Cl.
USPC ........................................ 92/223; 29/888.048

(58) Field of Classification Search ............ 92/155, 92/222, 223; 29/888.048
See application file for complete search history.

(56) References Cited

U.S. PATENT DOCUMENTS

| | | | |
|---|---|---|---|
| 4,975,243 A | 12/1990 | Scott et al. | |
| 6,863,922 B2 | 3/2005 | Ogihara et al. | |
| 6,913,207 B2 | 7/2005 | Miyamoto et al. | |
| 8,231,741 B2 * | 7/2012 | Fujiwara et al. | 29/888.048 |

FOREIGN PATENT DOCUMENTS

| | | |
|---|---|---|
| JP | 5-86443 | 4/1993 |
| JP | 10-176615 | 6/1998 |
| JP | 11-236677 | 8/1999 |
| JP | 2000-282259 | 10/2000 |
| JP | 2005-330941 | 2/2005 |

* cited by examiner

*Primary Examiner* — Michael Leslie
(74) *Attorney, Agent, or Firm* — Merchant & Gould P.C.

(57) ABSTRACT

A piston allowing a lubrication layer of a resin coating with a low friction coefficient to be tightly adhered to a skirt portion of a piston for an internal combustion engine, with low friction, superior wear resistance, and superior anti-seizing properties and that can reduce wear of a cylinder inner wall even if the lubrication layer is peeled off or abraded, is provided. Metal or ceramic fine particles having an average particle diameter of 20 μm to 400 μm are injected with compressed air or compressed nitrogen as a mixture fluid onto the skirt portion of the piston, made of an aluminum alloy and produced by a method such as casting or forging, at an injection speed of 80 m/s or more or an injection pressure of 0.2 MPa or more to be collided with the skirt portion, thereby uniformly making a microstructure of a piston base material fine-grained in a depth range of 1 μm to 15 μm from a surface of the skirt portion and forming a modified layer with an activated surface. A lubrication layer is formed on the modified layer, for example, by applying a resin with a low friction coefficient, while a surface of the modified layer is being activated.

14 Claims, 9 Drawing Sheets

METHOD FOR SURFACE TREATMENT OF A SKIRT PORTION OF A PISTON FOR AN INTERNAL COMBUSTION ENGINE AND A PISTON FOR AN INTERNAL COMBUSTION ENGINE

BACKGROUND OF THE INVENTION

1. Field of the Invention

The present invention relates to a method for surface treatment of a skirt portion of a piston for an internal combustion engine and a piston for an internal combustion engine treated by the method. More specifically, the present invention relates to a method for surface treatment of a skirt portion of a piston for an internal combustion engine (hereinafter also simply referred to as "skirt portion") in which initial break-in characteristics are satisfactory to achieve a reduction in frictional resistance with respect to an inner wall of a cylinder and in which wear resistance, low frictional resistance, and anti-seizing properties can be maintained even with long-term use, and also relates to a piston for an internal combustion engine treated by the method.

2. Description of the Related Art

Global warming is escalating, and a reduction in emission of $CO_2$ gas, a greenhouse gas, is becoming a worldwide challenge today. Accordingly, it is strongly required to reduce the emission of $CO_2$ gas also in automobiles, which are $CO_2$ gas emission sources, and a reduction in the amount of emission gases, and therefore $CO_2$, gas has been actively attempted by decreasing fuel consumption by reducing weight of automobiles and reducing friction of sliding parts, as well as improving a powertrain (driveline part).

Under such circumstances, reducing the weight of each part constructing an automobile and reducing the friction of sliding parts are unavoidable challenges, and, at the same time, it is required to reduce a cost of automobiles due to escalation of global competition and to exploit developing-country markets. Therefore, the reduction in weight of automobile parts and the reduction in friction of sliding parts that should be accomplished with the reduction in $CO_2$ gas emissions must be achieved at low cost.

From these viewpoints, among automobile components, reducing the weight and friction of a piston, which is an engine part directly affecting the emission of $CO_2$ gas, is a challenge that must be achieved. In particular, in a piston that reciprocates inside a cylinder at high speed, an increase in mechanical frictional resistance directly leads to energy loss.

In the piston of an internal combustion engine, a skirt portion in sliding contact with the inner wall of the cylinder largely affects the friction; accordingly, a reduction in the friction has also been attempted by applying a coating or the like having a low friction coefficient onto the skirt portion. As an example, it has also been proposed to try to reduce the friction of a piston by forming a coating layer made of a material whose friction coefficient with respect to a cylinder is smaller than that between the skirt portion and the cylinder, for example, a resin or molybdenum disulfide, into a predetermined shape with a die in advance and attaching the coating layer to the outer circumference of the skirt portion provided with a striation helically extending on the outer circumferential surface with an adhesive or the like (Japanese Patent KOKAI (LOPI) No. 2005-330941).

In the above-described conventional technology, friction generated by sliding contact of the skirt portion with the cylinder inner wall can be reduced by applying the coating having a low friction coefficient onto the skirt portion.

However, since the reduction in friction by the method described above is achieved by the low friction coefficient characteristics of the coating, a low friction effect cannot be obtained when the coating layer is abraded or peeled off.

Therefore, in order to maintain the friction reducing effect of the coating for a long time, it is necessary to prevent the occurrence of peeling by firmly attaching the coating to the surface of the skirt portion.

In addition, the reduction of friction by a coating as described above is achieved in many cases for enhancing the initial break-in of a piston, and in cases where the coating is formed for such a purpose, the coating is abraded by operation for a predetermined time (for example, break-in operation) and is lost. Consequently, after the loss of the coating by abrasion, the material of the skirt portion, such as an aluminum alloy, comes into direct contact with the inner wall of the cylinder. However, it is certainly required to reduce friction and prevent the occurrence of seizing also under such circumstances.

Incidentally, it is assumed that the adhesive force of a coating layer formed on the skirt portion surface is usually achieved by mechanical adhesion called an anchor effect (fastener effect) and a physicochemical bond such as a hydrogen bond or a van der Waals bond. Therefore, it is predicted that if the adhesive force based on these principles can be increased, a coating that is difficult to peel off from the skirt portion of the piston will become possible.

Here, the enhancement of the adhesive force exhibited by the anchor effect is caused by mechanical scratches generated by a film of a coating agent or by an adhesive penetrating into recesses on the surface of the skirt portion, solidifying and becoming rooted therein.

In order to increase the adhesive force due to the anchor effect, it is preferred to form asperities, on the surface of the skirt portion, into which the film or the adhesive penetrates or with which the film or the adhesive is joined, but this requires modifying the surface condition of the skirt portion. In addition, the required work and processing for forming the recesses on the surface of the skirt portion cause an increase in cost.

Furthermore, when the recesses are formed in the skirt portion for obtaining the anchor effect, the asperities on the surface of the skirt portion may also appear on the surface of a coating formed on the surface of the skirt portion. Therefore, the surface roughness of the coating surface is increased, and, as a result, friction is increased.

On the other hand, of the above-described physicochemical bonds, the hydrogen bond is a bond generated when the piston base material serving as an adherend, a coating agent, or an adhesive has active hydrogen in its molecules. For example, as shown in FIG. 10A, the hydrogen bond is generated by a hydroxide (OH) or an oxide (O) created in an Al component of the skirt portion bonding with O or H of the coating agent (for example, a polyamide-imide resin), which exhibits relatively high bonding force.

Furthermore, the bond due to van der Waals force, which is another physicochemical bond, is a bonding force created by interaction between a constituent molecule of the skirt portion and a constituent molecule of the coating layer. Even in a molecule that is electronically neutral and nonpolar, exhibiting hardly any dipole moment, electron distribution in the molecule is not steadily maintained under symmetrical and nonpolar conditions and instantaneously becomes asymmetrical. In this example, as shown in FIG. 10B, an electrical dipole (dipole moment) is formed by the positively polarized C and the negatively polarized O of a functional group of the constituent molecules of the coating layer; O and H of the hydroxyl group (OH) of an Al hydroxide constituting the skirt portion are respectively polarized negatively and positively; and O⁻ of the functional group and H⁺ of the hydroxyl group bond to each other to create a bonding force.

Accordingly, in order to generate such a physicochemical bond, the surface of the skirt portion is required to be kept clean. Contamination of the surface causes a lack of adhesive force, and in order to obtain adhesive force due to the physicochemical bond, it is necessary that the skirt portion be washed and then subjected to a drying step, as preceding steps of the coating. This work is complicated and also leads to an increase in cost as a result of consumption of washing solutions, waste liquid treatment, or the like.

In addition, the aluminum alloys used in casting are mostly of a eutectic composition. Therefore, the base material microstructure of the manufactured piston is composed of Al dendrite crystals that are first produced from molten metal in the process of cooling and then grow large according to the cooling and a eutectic microstructure of Al and an alloy component such as Si, Cu, or Mg, which is generated when the remaining molten metal, whose alloy component concentration is relatively increased by the production of the dendrite crystals, reaches the eutectic composition. Therefore, segregation occurs in the distribution of the alloy components, and also coarsening of the microstructure readily occurs. In particular, these tendencies are high near a surface that is rapidly cooled by being brought into contact with, for example, a mold.

In such an aluminum alloy having segregation in the distribution of the alloy components and the coarsened microstructure, a region where physicochemical bonds with the coating is strong and a region where physicochemical bonds with the coating is poor are generated, thereby destabilizes the adhesive force. Consequently, peeling of the coating readily occurs, starting from the region of weak adhesive force.

In addition, such an aluminum alloy having segregation of the alloy components and coarsened microstructure is fragile, and the wear resistance when the base material is brought into direct contact with the cylinder inner wall due to, for example, abrasion of the coating is low.

Regarding the above-mentioned points, it is believed that in the piston described in '941 cited above the adhesive force can be increased because the surface area of the skirt portion is increased by forming a helical striation in the skirt portion.

However, when a coating layer is formed by, for example, direct application of a resin material onto the skirt portion surface on which a striation is formed, asperities corresponding to the striation appear also on the surface of the coating layer, which increases surface roughness and increases friction under fluid lubrication between the cylinder inner wall and the skirt portion surface.

Therefore, in the invention disclosed in '941, in order to prevent the striation formed in the skirt portion from appearing on the surface of the coating layer, the coating layer is molded in advance by casting a molten resin in a die (mold), and this coating layer is attached to the skirt portion with an adhesive ('941, Paragraphs [0035] and [0036]). Therefore, the work is complicated and expensive compared with the case where the coating layer is formed by, for example, directly applying a resin material onto the skirt portion.

Furthermore, in order to enhance the adhesive property of an adhesive, as described above, since the surface of the skirt portion is required to be kept clean, steps such as washing are necessary. In addition, the invention disclosed in '941 does not include a configuration that can enhance the adhesive force caused by the above-described physicochemical bonds.

Furthermore, the invention disclosed in the above-mentioned '941 describes that, even if the coating layer provided on the skirt portion is peeled off, since contact between the base material and the cylinder inner wall occurs at a peak portion of the helical striation, plane-to-plane contact is not formed, and thereby the occurrence of seizure can be prevented.

However, when the skirt portion surface having asperities due to the formation of the helical striation and the cylinder inner wall are in sliding contact with each other, the frictional resistance between the two is increased. This significantly increases the friction in sliding contact against the cylinder inner wall.

In addition, since the base material of the skirt portion is not subjected to any treatment for achieving high wear resistance or reducing friction, even if the worst condition, i.e., the occurrence of seizure, can be temporarily avoided, a large loss in energy and also wear of the skirt portion and the cylinder inner wall are caused by continuous operation in the state where the base material of the piston is in direct contact with the cylinder inner wall due to the peeling or wearing of the coating layer. Therefore, the life of piston in the above-mentioned configuration is virtually brought to an end with the peeling of the coating layer.

Therefore, this technology cannot be applied to a piston that is designed to be continously used after wearing or peeling of the coating, for example, as in the case where the skirt portion is subjected to coating for enhancing the initial break-in characteristics of an engine.

Accordingly, the present invention has been accomplished for solving the defects in the above-described conventional technologies, and it is an object of the present invention to provide a method for surface treatment of a skirt portion of a piston for an internal combustion engine, wherein a lubrication layer of a resin coating having a friction reducing effect can be made to firmly adhere to the surface of the skirt portion at relatively low cost and with a simple process, the frictional resistance against the cylinder inner wall can be reduced even if the lubrication layer is peeled or abraded, and effects of providing excellent wear resistance and anti-seizing properties and of reducing the aggressiveness against the counterpart (cylinder inner wall) in sliding contact therewith (reduction in the degree of wear of cylinder inner wall) are obtained, and to provide a piston for an internal combustion engine treated by the method.

SUMMARY OF THE INVENTION

In order to achieve the above-mentioned object, in a method for surface treatment of a skirt portion of a piston for an internal combustion engine of the present invention, an object to be treated is a skirt portion of an internal combustion piston, made of an aluminum alloy and produced by a method such as casting or forging, and the method includes:

performing base treatment by injecting metal or ceramic fine particles having an average particle diameter of 20 μm to 400 μm with compressed air or compressed nitrogen as a mixture fluid onto the skirt portion at an injection speed of 80 m/s or more or an injection pressure of 0.2 MPa or more to be collided with the skirt portion, thereby uniformly making the microstructure of a piston base material fine-grained in a depth range of 1 μm to 15 μm from the surface of the skirt portion and activating the surface for forming a modified layer; and forming a lubrication layer composed of a resin coating with a low friction coefficient on the surface of the skirt portion after the base treatment, while a surface of the modified layer is being activated.

Furthermore, another method for surface treatment of a skirt portion of a piston for an internal combustion engine of the present invention includes forming a modified layer as a base treatment including a formation of a metal oxide layer described below;

performing another base treatment for forming a metal oxide layer having an activated surface by injecting fine particles containing elemental Sn, Zn, or Zr and having an average diameter of 20 μm to 400 μm with compressed air or compressed nitrogen as a mixture fluid onto the skirt portion provided with the modified layer at an injection speed of 80 m/s or more or an injection pressure of 0.2 MPa or more to be collided with the skirt portion, thereby allowing the elemental Sn, Zn, or Zr to diffuse and penetrate into the modified layer and to be oxidized; and forming a lubrication layer composed of a resin coating with a low friction coefficient on the surface of the skirt portion after the another base treatment, while the metal oxide layer is being activated.

Furthermore, the piston for the internal combustion engine of the present invention has a modified layer in which the microstructure of a piston base material is uniformly made fine-grained in a depth range of 1 μm to 15 μm from the surface of the skirt portion by injecting metal or ceramic fine particles having an average particle diameter of 20 μm to 400 μm with compressed air or compressed nitrogen as a mixture fluid onto the skirt portion for an internal combustion engine, made of an aluminum alloy and produced by a method such as casting or forging, at an injection speed of 80 m/s or more or an injection pressure of 0.2 MPa or more to cause collision; and a lubrication layer composed of a resin coating with a low friction coefficient formed on the skirt portion surface, while a surface of the modified layer is being activated.

With the configuration of the present invention described above, the following notable effects are provided.

The lubrication layer formed on the skirt portion surface exhibits high adhesive force with respect to the skirt portion and has superior durability, thus providing a piston for an internal combustion engine that shows stable low friction properties over a long period of time.

In addition, by forming the modified layer, even if a lubrication layer is formed, for example, without washing the piston, serving as an object to be treated, it is possible to form the lubrication layer having high adhesive force. Therefore, the lubrication layer having high adhesive force can be formed at low cost by omitting the washing step.

Furthermore, in the piston for the internal combustion engine subjected to the surface treatment, even if the modified layer is brought into contact with the cylinder inner wall due to abrasion of the lubrication layer formed on the surface, the modified layer exhibits low friction properties, has superior wear resistance and anti-seizing properties, and can reduce the aggressiveness against the cylinder inner wall, which is the counterpart in sliding contact therewith.

The hardness near the surface is increased by oxidation of the Al component near the surface of the base material when the particles for forming the modified layer are injected with compressed air and by nitridation of the Al component near the surface of the base material when the particles are injected with compressed nitrogen, resulting in further improvement of the wear resistance.

Note that, although the hardness of Al is significantly increased by being oxidized or nitrided compared with that of the unoxidized or unnitrided state, the oxidation or nitridation of Al caused by the above-mentioned method has a tilting structure in which bonding quantity with oxygen or nitrogen is decreased as goes from a surface side of the base material to the inside, thus the modified layer has a structure in which the hardness is high at the surface portion at which the bonding quantity with oxygen or nitrogen is high and the hardness is gradually reduced as goes to the inside. Consequently, a sharp difference of hardness between the unoxidized or unnitrided base material and the modified layer in which oxidation or nitridation of Al is generated, is prevented. As a result, peeling or the like of the modified layer due to a difference in hardness is prevented.

Furthermore, the surface roughness of the modified layer is set to 0.5 μm to 2.5 μm, in terms of the center-line average roughness (Ra), by setting the average particle diameter of the particles used for forming the modified layer to 20 μm to 400 μm. As a result, the lubrication layer formed on this modified layer has a surface roughness Ra of 1.0 μm or less. This surface roughness of the lubrication layer is a level enabling a reduction in the friction by the sliding contact with the cylinder inner wall under oiled conditions.

Furthermore, the fine asperities with an Ra of 0.5 μm to 2.5 μm formed on the modified layer function as oil reservoirs when the modified layer comes into direct contact with the cylinder inner wall due to abrasion of the lubrication layer. This can provide an effect of preventing oil film from running.

In a configuration in which a layer of a metal oxide of Sn, Zn, or Zr is further formed on the modified layer before the formation of the lubrication layer, in addition to the above-described effects, low friction properties, wear resistance, and anti-seizing properties after the abrasion of the lubrication layer are further enhanced.

In addition, since Sn, Zn, and Zr are, as in the above-mentioned Al, considerably increased in hardness by being oxidized compared with the unoxidized state, the metal oxide layer functions as a hard coating for protecting the skirt portion surface when the metal oxide layer is exposed at the surface by abrasion of the lubrication layer. At the same time, the metal oxide layer formed by the above-mentioned method is formed by diffusion and penetration of an element such as Sn into the modified layer and thereby has high adherence strength. In addition, the metal oxide layer has a tilting structure in which bonding quantity with oxygen is decreased as goes from the surface side to the inside, and therefore has a tilting structure of hardness in which the hardness is gradually reduced from the surface portion at which the bonding quantity with oxygen is high as goes to the inside, consequently, a sharp difference of hardness from the base material can be avoided. Therefore, peeling or the like due to a difference in hardness can be avoided.

When the piston, serving as an object to be treated, is made of an Al—Si based aluminum alloy, the Si component, an alloy component, is prevented from segregating by making the base material microstructure fine-gained, thereby making the distribution of the Si component uniform. Accordingly, the adhesive properties involving the physicochemical bond are made uniform to further prevent the occurrence of peeling of the lubrication layer, and also fragility due to the segregation of the alloy component is reduced to enhance the mechanical strength, such as the wear resistance.

Furthermore, when the lubrication layer is formed within three hours after the base treatment, a lubrication layer having high adherence strength could be provided.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENTS

Embodiments of the present invention will now be described below.

Object to be Treated (Piston for Internal Combustion Engine)

A piston for an internal combustion engine serving as an object to be treated in the present invention is not limited to pistons for a certain kind of internal combustion engine, such as a gasoline engine or a diesel engine; various types of pistons can be treated as long as they are for internal combustion engines.

The piston for the internal combustion engine to be treated is made of an aluminum alloy, and those manufactured by either casting or forging can be treated in the present invention. The type of the aluminum alloy is not particularly limited, and any known material that is used for a piston may be used.

In particular, in Al—Si-based alloys, Al—Cu-based alloys, and Al—Mg-based alloys each having a eutectic composition, which are usually used as aluminum alloys for casting, Al dendrite crystals and a eutectic composition of Al and Si, Cu, or Mg as an alloy component are produced. Thus, segregation of the alloy component and coarsening of the microstructure tend to occur, but an increase in the physicochemical bonding force of the lubrication layer by the surface treatment according to the method of the present invention can be expected. Therefore, the above-mentioned alloys can be employed as the object to be treated. In particular, a piston made of an Al—Si-based alloy, a typical material of a piston, is the main object to be treated of the present invention.

The treatment region of the piston is a skirt portion. This skirt portion is a region where sliding occurs by contact with a cylinder inner wall, and a reduction in frictional resistance of this region is effective for reducing the friction of the piston.

Treatment Process

The treatment of the above-described piston is performed by the following method.

Base Treatment

Before forming a lubrication layer composed of a resin coating having a low friction coefficient described below, the following base treatment is applied to the skirt portion.

Figure 1:
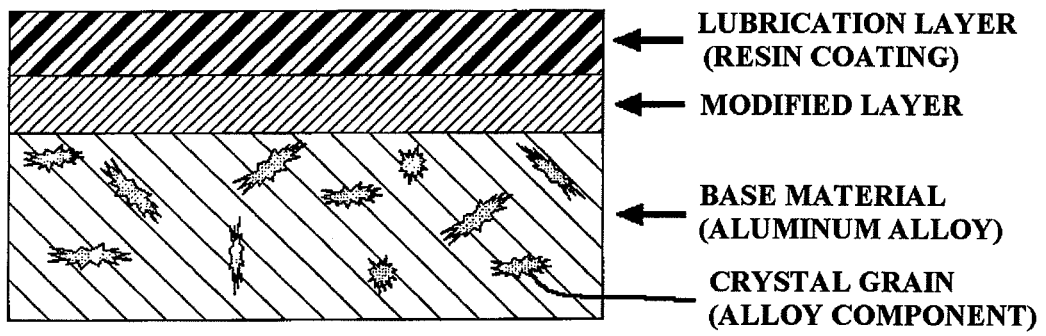
FIG. 1 is a schematic diagram illustrating a layer structure of a skirt portion of an internal combustion piston of the present invention.
Figure 2:
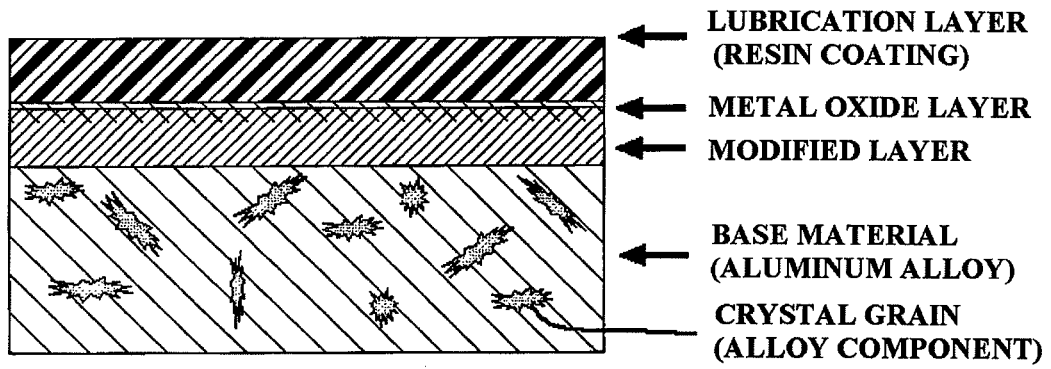
FIG. 2 is a schematic diagram illustrating another layer structure of a skirt portion of a piston for an internal combustion engine of the present invention.

This base treatment may be merely the formation of a modified layer by making the microstructure of a surface region of the piston base material fine-grained (FIG. 1), or may further include the formation of a metal oxide layer in addition to the formation of the modified layer (FIG. 2).

Formation of Modified Layer

This is a step of forming a modified layer by injecting metal or ceramic fine particles having an average diameter of 20 μm to 400 μm with compressed air or compressed nitrogen as a mixture fluid onto a skirt portion surface of a piston at an injection speed of 80 m/s or more or an injection pressure of 0.2 MPa or more to be collided with the skirt portion surface, thereby uniformly making the microstructure of the piston base material fine-grained in a depth range of 1 μm to 15 μm from the skirt portion surface and forming the modified layer having an activated surface.

As the particles to be injected, ceramic-based ones, such as SiC, or metal-based ones, such as steel, can be used; and any type of particles that can make the microstructure fine-grained in a depth range of 1 μm to 15 μm from the skirt portion surface can be used.

The shape of the particles used for forming the modified layer is not particularly limited, but is preferably spherical.

As the compressed gas used for injection, compressed air or compressed nitrogen can be used.

As described above, in an aluminum alloy for casting, which generally has a eutectic composition, when a piston is produced, Al dendrite crystals are first produced in the molten metal during the process of solidification and grow while cooling to become coarsened. At the same time, when the remaining molten metal, whose alloy component concentration is relatively increased according to the production of the dendrite crystals, reaches a eutectic composition (11.7 mass % Si in the Al—Si-based alloy, 33 mass % Cu in the Al—Cu-based alloy, and 35 mass % Mg in the Al—Mg based alloy), a eutectic composition of Al and the alloy component is generated, and thereby the alloy component is segregated in the microstructure. However, as described above, the microstructure of the aluminum alloy serving as the base material is made fine-grained on the skirt portion surface by injecting the metal or ceramic particles in the method of the present invention onto the skirt portion surface to be collided therewith, and also the distribution of the segregated alloy component is made uniform by making the microstructure fine-grained.

In addition, it is believed that a newly generated surface is exposed at a collision region of the skirt portion surface where collision and friction with the injected particles are occurred, and electrons (exoelectrons) are emitted (Kramer effect) to activate the portion.

Thus, the formation of the modified layer makes the surface microstructure of the skirt portion fine-grained and also activates it, which makes it possible to enhance the adhesive properties of the subsequently formed lubrication layer, which is described below, when the lubrication layer is formed.

In addition, the thus-formed modified layer is provided with a surface modified effect by shot peening, such as imparting compressive residual stress. Furthermore, since the base material at the region of collision with the particles generates heat, in the case of using compressed air for injecting of the particles, the aluminum component in the base material reacts with oxygen to form an oxide of aluminum, resulting in an increase in surface hardness of the modified layer. In addition, in the case of using compressed nitrogen, the aluminum component in the base material reacts with nitrogen to produce aluminum nitride (AlN), which is a known nitrogen-based ceramic, resulting in improved mechanical strength, such as enhanced hardness and wear resistance of the base material surface.

Furthermore, the modified layer formed by injecting the particles with the above-mentioned diameter has a surface roughness of 0.5 μm to 2.5 μm, in terms of the center-line average roughness (Ra).

Formation of Metal Oxide Layer

The lubrication layer described below may be formed directly on the surface of the above-described modified layer formed on the skirt portion surface, but a metal oxide layer made of tin oxide, zinc oxide is formed by injecting fine particles including Sn, Zn, or Zr, before the formation of the lubrication layer described below.

Such a metal oxide layer can be formed by injecting fine particles containing elemental Sn, Zn, or Zr and having an average diameter of 20 μm to 400 μm onto the skirt portion provided with the modified layer at an injection speed of 80 m/s or more or an injection pressure of 0.2 MPa or more to be collided therewith. Thus, the elemental Sn, Zn, or Zr in the particles diffuses and penetrates into the modified layer and is oxidized to form a metal oxide layer having an activated surface.

The particles used for the injection may be pure metallic particles made of only the above-mentioned Sn, Zn, or Zr, or may be made of an alloy containing any of these metal elements.

The shape of the particles to be used is not particularly limited, and particles with various shapes can be used, such as spherical or polygonal shapes or those containing a large number of amorphous particles.

As described above, in the collision of the particles containing elemental Sn, Zn, or Zr onto the skirt portion surface, the particles bounce back from the surface of the skirt portion after collision.

In this collision, heat is generated in the collided region between the particles and the skirt portion surface by the energy of the collision, and the elemental Sn, Zn, or Zr in the particles reacts with oxygen in the air to form a metal oxide, and the metal oxide diffuses and penetrates from the surface of the modified layer formed on the skirt portion surface in a certain depth range and is alloyed to form a metal oxide layer.

In the thus-formed metal oxide layer, since the layer is formed by alloying the oxide of the elemental Sn, Zn, or Zr and the metal constituting the skirt portion, as described above, the level of adherence strength with respect to the surface of the skirt portion is high, so that the metal oxide layer is hardly peeled off by, for example, sliding contact with the cylinder inner wall.

Furthermore, the hardness of Sn, Zn, or Zr is significantly increased by being oxidized compared with that of the unoxidized state. However, the metal oxide layer formed by the method above is formed by the diffusion and penetration of the elemental Sn, Zn, or Zr into the modified layer and has a tilting structure in which bonding state with oxygen is gradually decreased from the surface side of the metal oxide layer, as goes to the inside, thus has a tilting structure of hardness in which the hardness is high at the surface side at which the bonding quantity with oxygen is high, and gradually reduced as goes to the inside.

Consequently, no sharp difference in hardness is created between each of the layers and between each layer and the base material, from the unmodified base material region to the modified layer and the metal oxide layer. Therefore, peeling due to the occurrence of a sharp difference in hardness hardly occurs.

In addition, the microstructure of the thus-formed metal oxide layer includes a fine-grained microstructure same as the above-described modified layer and a surface of the metal oxide layer is activated by the collision with the particles containing Sn, Zn, or Zr.

As the compressed gas used in the formation of the above-described oxide metal layer, compressed air or compressed nitrogen can be used, but compressed nitrogen is preferable.

The use of compressed nitrogen has an effect of nitriding at least part of the Al component in the piston base material, as described above. This further strengthens the adhesive force of the formed metal oxide layer and also has an effect of improving the mechanical strength near the surface of the base material.

In addition, when the particles containing Sn, Zn, or Zr are thus injected by compressed nitrogen, the nitrogen concentration in the atmosphere at the collided region between the particles and the skirt portion surface is increased. However, the compressed nitrogen injected by a blast gun causes turbulence in the air around the blast gun, after the injection, changing to a mixture fluid with the air. At the same time, the elemental Sn, Zn, or Zr is oxidized by oxygen in the air present around the compressed collision region. In the case of injection using compressed nitrogen, both the nitriding of the Al component constituting the piston base material and oxidizing of the elemental Sn, Zn, or Zr are possible.

Furthermore, the surface roughness of the formed metal oxide layer is set to 0.5 μm to 2.5 μm, in terms of the center-line average roughness (Ra), by setting the average particle diameter of the particles containing Sn, Zn, or Zr to 20 μm to 400 μm.

Formation of Lubrication Layer

On the modified layer or the metal oxide layer formed by the above-described base treatment, a lubrication layer composed of a resin coating having a low friction coefficient is formed.

The low-friction-coefficient resin constituting the lubrication layer is required to have a heat resistance that can withstand the heat generated by a piston during the operation of an internal combustion engine. As an example, an epoxy-based resin or a polyamide-imide resin (hereinafter referred to as "PAI resin") is used.

The lubrication layer is formed by applying a resin that will become the lubrication layer by a known method, such as injection or printing, such that the thickness of the formed layer is 8 μm to 17 μm. As an example, in the case of forming a lubrication layer of the above-mentioned PAI resin, varnish prepared by diluting the PAI resin with a solvent (N-methylpyrrolidone) is applied on the modified layer or the metal oxide layer, followed by baking and drying to form the layer.

The surface of the thus-produced lubrication layer is preferably smooth, and the surface roughness is regulated to 1.0 μm or less, in terms of the center-line average roughness (Ra), by forming the lubrication layer on the modified layer or the metal oxide layer having a surface roughness of 0.5 μm to 2.5

μm, in terms of the center-line average roughness (Ra), as described above.

Effects Etc.

In the piston for the internal combustion engine in which the skirt portion is base-treated as in the above and is then provided with the lubrication layer composed of a low-friction-coefficient resin described above, the lubrication layer exhibits high adhesive force to the modified layer or the metal oxide layer serving as the base, and also the formed lubrication layer contributes to a reduction in friction of the piston.

In addition, in the piston having the skirt portion subjected to such surface treatment, even if the lubrication layer composed of a resin coating is lost due to wearing or peeling and the skirt portion thereby comes into direct contact with the cylinder inner wall, high wear resistance, low friction properties, and anti-seizing properties are exerted, and the aggressiveness against the counterpart (cylinder inner wall) in sliding contact therewith is low (the cylinder inner wall is not worn).

Enhancement of Adhesive Force

The mechanism for obtaining the above-described enhancement of adhesive force is not exactly clear, but it is assumed that the adhesive force is synergistically enhanced by the formation of fine asperities having an Ra of about 0.5 μm to 2.5 μm, corresponding to the particle diameter of the particles, on the surface of the skirt portion by collision with the particles; making of the surface microstructure fine-grained and making the distribution of the alloy component uniform by collision with the particles, and bringing about activation of the surface.

Improvement of Adhesive Properties by Formation of Asperities

As described above, an anchor effect is referred as one reason for the enhanced adhesive force of the lubrication layer to the skirt portion surface. That is, as described above, the injection and collision of particles against the skirt portion form countless fine recesses into which the resin applied to the skirt portion surface penetrates to become rooted therein. Therefore, it is believed that the enhanced anchor effect contributes to an enhancement in the adherence strength of the lubrication layer.

Figure 3:
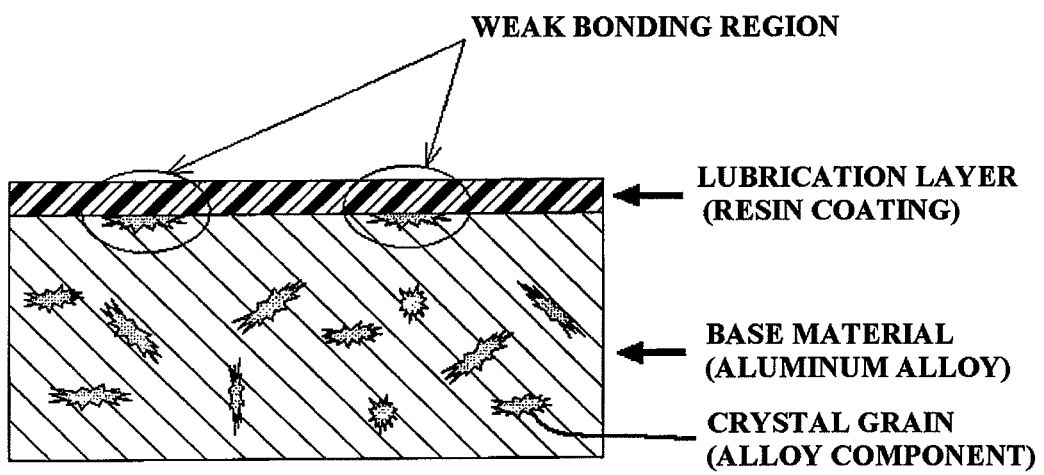
FIG. 3 is an explanatory diagram for explaining a mechanism of occurrence of nonuniformity in the adhesive force of a lubrication layer due to nonuniformity of the base material microstructure.

Improvement in Adhesive Properties by Microcrystallization or the Like of Surface Microstructure As described above, in an Al—Si—, Al—Cu—, or Al—Mg-based alloy or the like of a eutectic composition, which is usually used as an aluminum alloy for casting, Al dendrite crystals and eutectic crystals of Al and the alloy component appear, and crystals (crystal grains) of the alloy component are not uniformly dispersed in the base material but are segregated, as shown in FIG. 3.

If a resin material forming the lubrication layer is, for example, directly applied onto the skirt portion surface in such a nonuniform state, the physicochemical bonding force generated between the base material and the resin varies according to the variation in the microstructure at the region where the resin material is contacted. Consequently, a region with satisfactory adhesive properties and a region with poor adhesive properties are generated, and peeling of the lubrication layer readily occurs, starting from the region with the poor adhesive properties.

On the other hand, according to the present invention, it is believed that superior adhesive properties are obtained by eliminating the region from which peeling starts by uniformly making the microstructure near the interface with the lubrication layer fine-grained by forming a modified layer before the formation of the lubrication layer or by forming a metal oxide layer and, simultaneously, by uniformizing the adhesive properties of the lubrication layer with respect to the modified layer or the metal oxide layer by uniformizing the distribution of the segregated alloy component.

Surface Activation

Furthermore, it is believed that when the particles collide against the skirt portion as described above, a newly generated surface of the aluminum alloy appears at the collided region by friction etc. due to collision with the particles, and electrons (exoelectrons) are emitted (Kramer effect) to activate the region.

It is believed that this activation (electron emission) enhances the above-described physicochemical bonding with the resin constituting the lubrication layer, resulting in superior adhesive properties and an enhancement in adherence strength.

Figure 4:
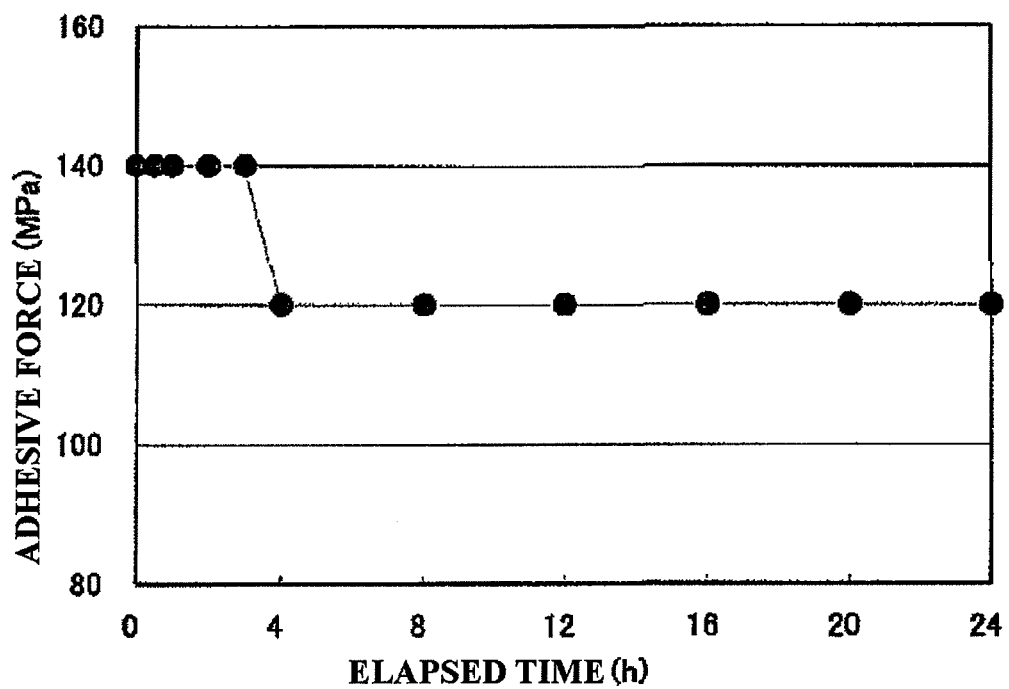
FIG. 4 is a graph showing a relationship between time elapsed after base treatment and change in adhesive force.

The conclusion that such an enhancement in adhesive properties is caused by the activation of the surface by the exposure of the above-mentioned newly generated surface is supported by the fact that the longer the time spent from the completion of the base treatment until the formation of the lubrication layer (therefore, the more the activation is reduced), the less the adhesive properties and adherence strength are enhanced (the effect is decreased), as shown in the section "Confirmation test of a relationship between the adhesive force of the lubrication layer and elapsed time" below (FIG. 4).

In addition, if the enhancement in the adhesive properties is caused by the activation of the surface as described above, it is predicted that, even in the case of injection particles having an average particle diameter of 800 μm to 1000 μm included in the particle diameter range used in usual blast treatment and is larger than that of the particles used for injection in the present invention, the adhesive force can be enhanced by the emission of electrons (exoelectrons) by the above-mentioned Kramer effect. However, the results of experiments showed that improvements in adhesive properties and adherence strength by injecting particles having an average particle diameter in the above-mentioned range were small, and notable improvement was not obtained.

From the results above, in the present invention, the surface area per unit weight of particles is increased by using fine particles having an average particle diameter of 20 μm to 400 μm, and the surface area of a newly generated surface of aluminum alloy being exposed to the base material surface is also increased by collision of the particles; as a result, the emission of electrons (exoelectrons) that affect the bonding with the lubrication layer is enhanced. Furthermore, it is believed that, for example, a difference between the collision energy generated by using the fine particles and the collision energy generated by using particles of a large diameter has the effect of achieving a notable improvement in the adhesive properties of the lubrication layer.

Reduction in Friction of Lubrication Layer Surface

Furthermore, by controlling the average particle diameter of the particles used in the injection within the range of 20 μm to 400 μm, the surface roughness of the surface of the modified layer or the metal oxide layer formed on the skirt portion surface by the collision of the particles is controlled to be relatively small (Ra: 0.5 μm to 2.5 μm). As a result, the resin forming the lubrication layer absorbs the surface roughness by applying the resin to the skirt portion surface, and the lubrication layer is processed so as to have a smooth surface with a surface roughness Ra of 1.0 μm or less, which can realize low friction in sliding contact under oiled conditions.

Improvement of Wear Resistance or the Like of Base Material of Skirt Portion of Piston The skirt portion of the piston subjecting to the surface treatment by the method of the present invention showed high wear resistance, low friction properties, and anti-seizing properties and had reduced aggressiveness against the cylinder inner wall (wear of the cylinder inner wall), even when the modified layer or the metal oxide layer serving as the base of the lubrication layer came into direct sliding contact with the cylinder inner wall by the loss of the lubrication layer composed of a resin coating due to wearing or peeling.

It is assumed that such a phenomenon is synergistically obtained by, for example, improvements in mechanical characteristics of the skirt portion surface, such as an improvement in fragility, by making the surface microstructure of the base material fine-grained and by making the distribution of the alloy component uniform by the collision of the injected particles;

improvements in mechanical characteristics of the skirt portion surface obtained by shot peening, such as imparting of compressive residual stress, which are believed to be also obtained by the collision of the above-described particles; and further an enhancement in the hardness near the skirt portion surface by the production of aluminum oxide by oxidizing the Al component in the base material by bonding with oxygen in compressed air when compressed air is used in the injection of the particles, or by the production of aluminum nitride by nitriding the Al component in the base material when compressed nitrogen is used in the injection, due to the heat generated in the collided region with the above-described injected particles.

In particular, in an example in which the metal oxide layer is further formed on the modified layer, the principle is not clear, but the wear resistance, low friction properties, and anti-seizing properties can be further improved, and the wear of the cylinder inner wall that is in sliding contact with the skirt portion can be reduced.

Furthermore, as described above, the fine asperities of the surface achieving a surface roughness Ra of 0.5 μm to 2.5 μm of the modified layer or metal oxide layer function as oil reservoirs when the modified layer or the metal oxide layer is exposed at the surface by abrasion of the lubrication layer and thereby comes into contact with the cylinder inner wall, which is expected to have an effect of preventing oil film from running.

EXPERIMENTS

Next, performance evaluation tests conducted on pistons having surfaces treated with the method of the present invention will be described below.

Adhesive Force Measurement Test for Lubrication Layer

Specimens

Pistons (cast product) made of an Al—Si-based aluminum alloy (AC8A) were used, and the surfaces of their skirt portions were treated under the conditions shown in Tables 1 to 6. The adhesive force of the formed lubrication layers was measured.

In addition, in order to investigate the possibility of a reduction in cost by omitting a pre-washing step, specimens in Embodiments 1 to 4 and Comparative Example 2 were treated without pre-washing.

TABLE 1

Surface treatment conditions for the piston in Embodiment 1 (modified layer and lubrication layer)

Modified layer
   Injection particles
      Material: high-speed steel
      Average particle diameter: 50 μm
      Shape: spherical
   Conditions of injection
      Injection apparatus: SG type blast processing apparatus manufactured by Fuji Manufacturing Co. Ltd.
      Nozzle diameter: φ 9 mm, injection distance: 100 mm
      Injection gas: compressed air
      Injection pressure: 0.6 MPa
      Injection time: 10 s for each side
Lubrication layer
   Material: PAI resin
   Application method: application, by printing, of varnish prepared by diluting the resin with N-methylpyrrolidone, followed by baking and drying
   Time until the application after the formation of modified layer: 30 min.
   Thickness of lubrication layer: 15 μm

TABLE 2

Surface treatment conditions for the piston in Embodiment 2 (modified layer, tin oxide layer, and lubrication layer)

Modified layer
   Injection particles: Same as Embodiment 1
   Conditions of injection: Same as Embodiment 1
Metal oxide layer
   Injection particles
      Material: tin
      Average particle diameter: 60 μm
      Shape: spherical
   Conditions of injection
      Same as Embodiment 1
Lubrication layer: Same as Embodiment 1

TABLE 3

Surface treatment conditions for the piston in Embodiment 3 (modified layer, zinc oxide layer, and lubrication layer)

Modified layer
   Injection particles: Same as Embodiment 1
   Conditions of injection: Same as Embodiment 1
Metal oxide layer
   Injection particles
      Material: zinc
      Average particle diameter: 45 μm
      Shape: polygonal
   Conditions of injection: Same as Embodiment 1
Lubrication layer: Same as Embodiment 1

TABLE 4

Surface treatment conditions for the piston in Embodiment 4 (modified layer, zirconia oxide layer, and lubrication layer)

Modified layer
   Injection particles: Same as Embodiment 1
   Conditions of injection: Same as Embodiment 1
Metal oxide layer
   Conditions of injection: Same as Embodiment 1
   Injection particles
      Material: zirconia
      Average particle diameter: 50 μm
      Shape: polygonal
   Conditions of injection: Same as Embodiment 1
Lubrication layer: Same as Embodiment 1

TABLE 5

Surface treatment conditions for the piston in Comparative Embodiment 1 (lubrication layer only)

Pre-treatment
    The surface is degreased, washed with water, then dried
Lubrication layer
    Material: PAI resin
    Application method: application, by printing, of varnish prepared by diluting with N-methylpyrrolidone, followed by baking and drying
    Thickness of lubrication layer: 15 µm

TABLE 6

Surface treatment conditions for the piston in Comparative Example 2 (modified layer and lubrication layer)

Pre-treatment
    Injection particles
        Material: steel
        Average particle diameter: 800 µm
        Shape: spherical
        Conditions of injection: Same as Embodiment 1
    Lubrication layer: Same as Embodiment 1

Test Method

The adhesive force was measured by a water-jet test. The water-jet test is performed by jetting water with high-pressure from a nozzle onto the surface of a lubrication layer formed on a skirt portion and then measuring the adhesive force.

Test Results

Table 7 shows the results of the adhesive force measurement of lubrication layers by the above-mentioned method. In addition, "adhesive force" in the Table shows the jet pressure (MPa) of the injected water, "○" indicates no peeling in the lubrication layer, and "x" indicates the occurrence of peeling in the lubrication layer.

TABLE 7

Measurement result of adhesive force of lubrication layer

| Adhesive force (MPa) | Specimen | | | | | |
|---|---|---|---|---|---|---|
| | Emb. 1 | Emb. 2 | Emb. 3 | Emb. 4 | Com. Exam. 1 | Com. Exam. 2 |
| 100 | ○ | ○ | ○ | ○ | ○ | ○ |
| 120 | ○ | ○ | ○ | ○ | ○ | ○ |
| 140 | ○ | ○ | ○ | ○ | x | x |

From the results above, it was confirmed that in an example in which a modified layer was formed before the formation of the lubrication layer (Embodiment 1), an example in which a tin oxide layer, in addition to a modified layer, was formed (Embodiment 2), an example in which a zinc oxide layer was formed instead of the tin oxide layer (Embodiment 3), and an example in which a zirconia oxide layer was formed instead of the tin oxide layer or the zinc oxide layer (Embodiment 4), the adhesive properties were notably enhanced compared with Comparative Example 1 in which a lubrication layer was directly formed on an untreated skirt portion surface without forming any layer thereabove.

The results confirmed the effectiveness of the surface treatment method of the present invention for enhancing the adhesive properties of a lubrication layer.

In addition, in the injection of the particles conducted prior to the formation of the lubrication layer, the adhesive properties of the lubrication layer formed at the skirt portion are not enhanced in the piston of Comparative Example 2 in which the injected particles have an average particle diameter of 800 µm, which is outside the range of particle diameters of the particles used in the formation of the modified layer of the present invention. Therefore, it was confirmed that it is effective to form the modified layer using relatively fine particles having an average particle diameter in the range of 20 µm to 400 µm.

Furthermore, in Embodiments 1 to 4, since the pistons were not washed prior to the formation of the modified layer, it is obvious that the lubrication layers having high adhesive force were formed even when the surface treatment of the present invention was carried out without washing the pistons, showing that a reduction in cost due to the omission of the washing step is feasible.

Confirmation Test of a Relationship Between the Adhesive Force of Lubrication Layer and Elapsed Time In order to confirm that formation of a lubrication layer after the formation of the modified layer and while the modified layer is being activated is effective for enhancing the adhesive force of the lubrication layer, a change in adhesive force caused by a change in elapsed time was measured by varying the time between the formation of the modified layer and initiation of the lubrication layer formation. During the elapsed time, the piston on which the modified layer was formed was left in the chamber until the start of the formation of the lubrication layer.

The treatment of the specimens used in the measurement was carried out under the same conditions as those shown in Table 1 except that the time between the formation of the modified layer and initiation of the lubrication layer formation was varied.

FIG. 4 shows the above measurement results. As shown in FIG. 4, the adhesive force sharply decreased around three hours or more after the formation of the modified layer and then plateaued at a substantially constant value after an elapsed time of about four hours.

This confirmed that the adhesive force enhancing effect achieved by the surface activation caused by the modified layer formation decreases about three hours after the formation of the modified layer and that it is preferred that the lubrication layer formation be carried out within three hours after the formation of the modified layer, preferably, immediately after the formation of the modified layer.

In addition, in the graph shown in FIG. 4, it is confirmed that when the modified layer was formed prior to the formation of the lubrication layer, even if the elapsed time exceeded four hours, the specimen showed a similar level of adhesiveness to an adhesive force of 120 (see Table 7) of Comparative Example 1 in which the lubrication layer was directly formed on the untreated piston.

In the specimen of Comparative Example 1, the surface was cleaned before the formation of the lubrication layer by degreasing, washing, and drying the skirt portion. However, in the pistons subjected to the surface treatment by the method of the present invention, the treatment was directly performed without degreasing, washing, and drying the skirt portions. Therefore, if the enhancement in adhesive force is attributed only to the activation of the surface, it is expected that the adhesive force four hours after the formation of the modified layer or later, it being believed that the activation is already lost, will become lower than that of the specimen in Comparative Example 1.

However, as shown in FIG. 4, the level of the adhesive force four hours after the formation of the modified layer or later is similar to that in Comparative Example 1 in which the lubrication layer was formed on the skirt portion subjected to the degreasing, washing, and drying. Therefore, it is seen that, in the piston subjected to the surface treatment by the method of the present invention, in addition to the enhancement in adhesive force caused by the activation of the surface, the enhancement in adhesive properties is also achieved by an effect that can compensate for the omission of the pre-washing step [an anchor effect by the fine recesses formed on the base material surface when the modified layer is formed or making the base material surface fine-grained].

Friction Coefficient Measurement Test

In order to confirm that the piston subjected to the surface treatment by the method of the present invention has low friction properties even after wearing of the lubrication layer, the friction coefficient was measured.

Figure 5:
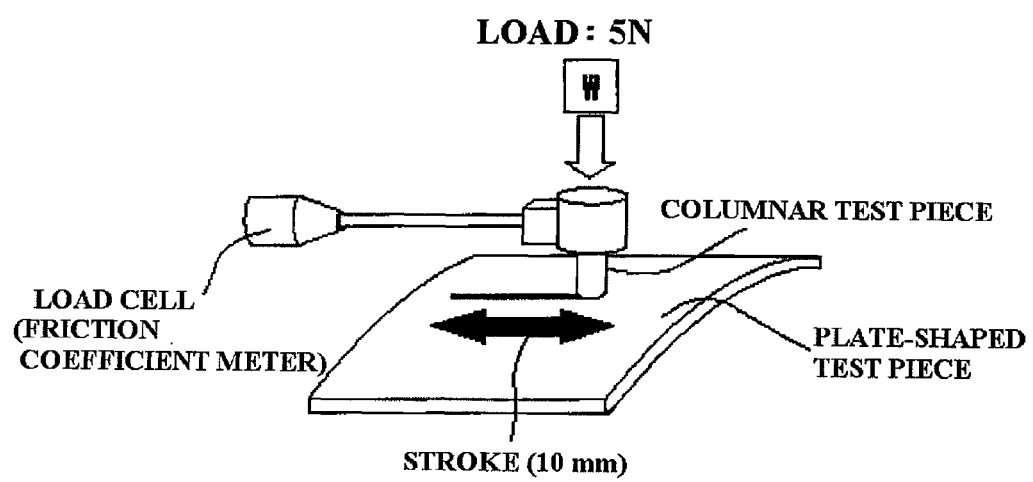
FIG. 5 is a schematic explanatory diagram of a test apparatus used in a friction coefficient measurement test.

The measurement was carried out using the measurement apparatus shown in FIG. 5. Plate-shaped test pieces were prepared by cutting out the skirt portions of the pistons of Embodiments 1 to 3 subjected to the surface treatment shown in Tables 1 to 3 (but without formation of the lubrication layer) and an untreated skirt portion. A columnar disc-shaped test piece (diameter: 5 mm, length: 12 mm) made of the same material as that of the cylinder liner (material: FC250 equivalent) was brought into perpendicular contact with each plate-shaped test piece. Engine oil 10W-30 was applied with a cotton swab only at the start of the test, and the columnar test piece under a load of 5 N was slidingly moved with a stroke of 10 mm and a reciprocation rate of 60 cycles/min. The elapsed time from the start of the test and the change in friction coefficient were measured.

Figure 6:
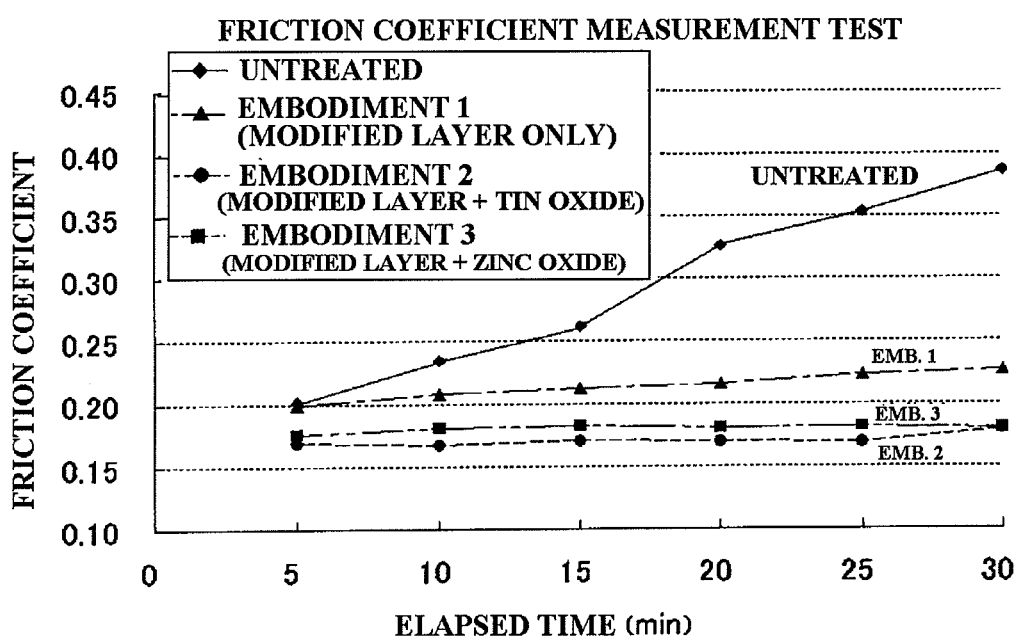
FIG. 6 is a graph showing the results of the friction coefficient measurement test.

FIG. 6 shows the measurement results. As is obvious from FIG. 6, in the untreated skirt portion, the friction coefficient gradually increased with the elapsed time from the start of the test to about two times the level of the friction coefficient at the start of the experiment at 30 minutes after the start of the test.

On the other hand, in the skirt portion of Embodiment 1 in which the modified layer was formed and the skirt portions of Embodiments 2 and 3 in which the metal oxide layer, in addition to the modified layer, was formed, the friction coefficient was substantially constant from immediately after the start of the test until 30 minutes had elapsed, and thereby it was confirmed that low friction properties were realized.

In particular, it was confirmed that, in those specimens in which the tin oxide layer or the zinc oxide layer was further formed on the modified layer (Embodiments 2 and 3), the initial friction resistance value was reduced, and the friction coefficient itself was reduced compared with the sample in which only the modified layer was formed (Embodiment 1).

In addition, it was confirmed that the friction coefficient in Embodiment 2 in which the tin oxide layer was formed was even lower compared with that in Embodiment 3 in which the zinc oxide layer was formed.

From the above, it was confirmed that compared with the piston of Embodiment 1 in which only the modified layer was formed, the pistons of Embodiments 2 and 3 in which the metal oxide layer was formed showed lower friction properties even after the wearing of the lubrication layer.

Wear Measurement Test

A test was carried out for confirming that the pistons subjected to the surface treatment by the method of the present invention have wear resistance even after wearing of the lubrication layer and, at the same time, do not have aggressiveness against the cylinder liner material (do not wear the cylinder liner), which is the counterpart in sliding contact therewith.

The test was performed by measuring the amounts of wear of the test pieces (the columnar disc-shaped test piece corresponding to the cylinder liner material, and the plate-shaped test pieces prepared by cutting out the skirt portions) after the completion of the above-described friction coefficient measurement test.

The amount of wear of the columnar disc-shaped test piece corresponding to the cylinder liner was measured by observing the sliding contact face with a laser microscope and measuring the total area ($mm^2$) of the worn region, and the amount of wear of the plate-shaped test pieces (cut out material of the skirt portion) was measured from the recess volume ($\mu m$) of the worn region measured with a roughness meter.

Figure 7:
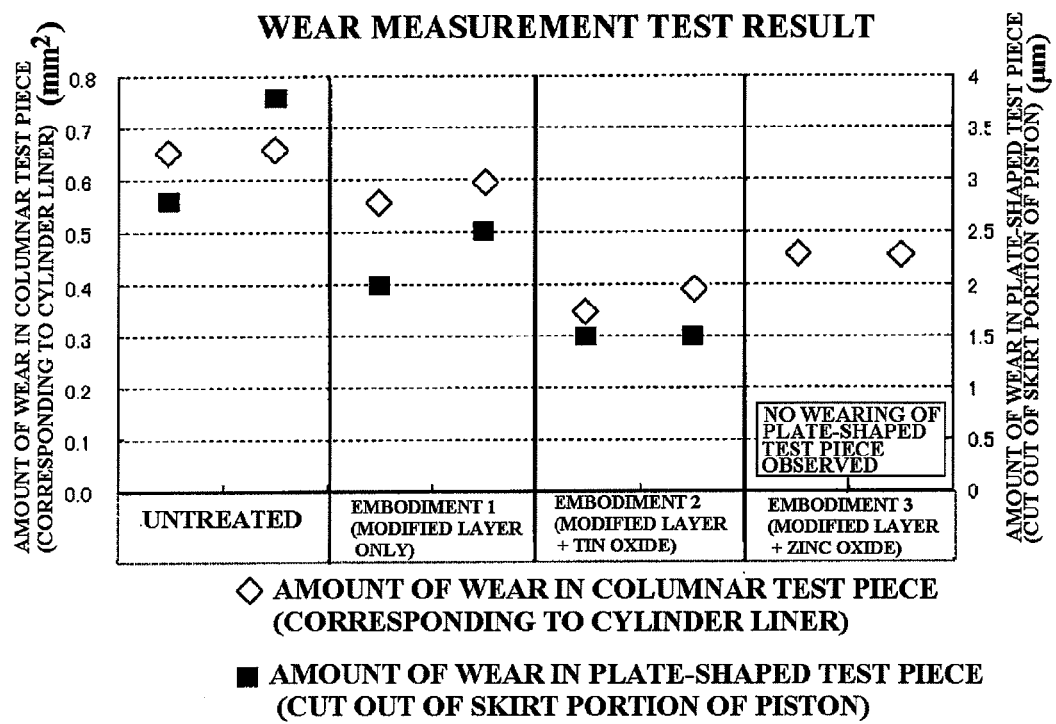
FIG. 7 is a graph showing the results of a wear measurement test.

FIG. 7 shows measurement results of the amounts of wear, obtained by the above methods. As is obvious from FIG. 7, it was confirmed that, compared with the untreated skirt portion, the amounts of wear of both the skirt portion and the cylinder liner were reduced in the cases where the skirt portion provided with a modified layer (Embodiment 1) and skirt portions further provided with a metal oxide layer in addition to the modified layer (Embodiments 2 and 3) were used.

In particular, it was confirmed that, compared with the case in which only the modified layer was formed (Embodiment 1), the amounts of wear of both the skirt portion and the cylinder liner were small when the metal oxide layer was formed.

In addition, in the skirt portion of Embodiment 3 in which the zinc oxide layer was formed, no wear was observed on the skirt portion, and thereby it was confirmed that wear resistance was extremely high. On the other hand, it was confirmed that the amount of wear of the columnar test piece corresponding to the cylinder liner, that is, the counterpart, was larger than that of Embodiment 2 in which the tin oxide layer was formed.

From the results, it was confirmed that, regarding the aggressiveness against the cylinder liner, which is the counterpart in sliding contact therewith, the skirt portion provided with the tin oxide layer (Embodiment 2) shows more preferable results.

Friction Mean Effective Pressure Measurement Test

In order to confirm that the pistons subjected to the surface treatment by the method of the present invention have low friction properties, friction mean effective pressure (FMEP) was measured in an evaluation using actual equipment.

Figure 8:
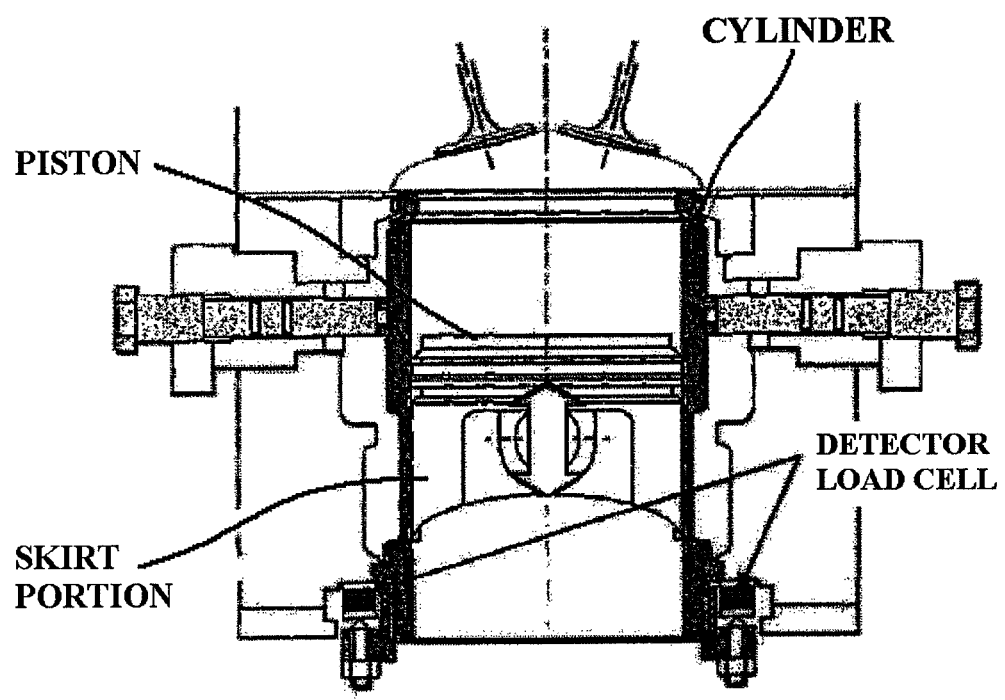
FIG. 8 is a schematic explanatory diagram of a test apparatus used in a friction mean effective pressure measurement test.

The measurement was carried out by using the measurement apparatus shown in FIG. 8 and detecting the frictional force between the cylinder liner and the skirt portion of the piston of Embodiment 1, subjected to the surface treatment shown in Table 1, or that of the piston of Comparative Example 1, subjected to the surface treatment shown in Table 5, using load cells.

Note that the "friction mean effective pressure (FMEP)" is a value obtained by dividing the frictional work generated by movement of a piston by the engine stroke volume.

From the results of the measurement test above, it was confirmed that the friction mean effective pressure in the piston of Embodiment 1 was about 14.5 kPa, and the friction mean effective pressure in the piston of Comparative Example 1 was about 16.8 kPa, showing that the friction in the piston of Embodiment 1 was reduced compared with that of the piston of Comparative Example 1.

Here, since the lubrication layer formed on the skirt portion in Embodiment 1 and the lubrication layer formed on the skirt portion in Comparative Example 1 are both made of the same material (PAI resin in both cases), it is believed that such a reduction in the friction is caused by the difference in the surface roughness of the formed lubrication layers.

Accordingly, the surface roughness of both lubrication layers was measured, and it was found that the Ra was about 0.6 μm in Embodiment 1 and the Ra was about 1.7 μm in Comparative Example 1.

In the surface treatment method of the present invention, the surface roughness of the modified layer was made relatively fine by using relatively fine particles having an average particle diameter of 20 μm to 400 μm (50 μm in Embodiment 1) in forming the modified layer. As a result, this surface roughness was absorbed by the resin applied to the skirt portion surface when the lubrication layer was formed on this modified layer, and thereby the surface roughness of the formed lubrication layer could be kept low, which is believed to have brought about a reduction in the friction.

Figure 9:
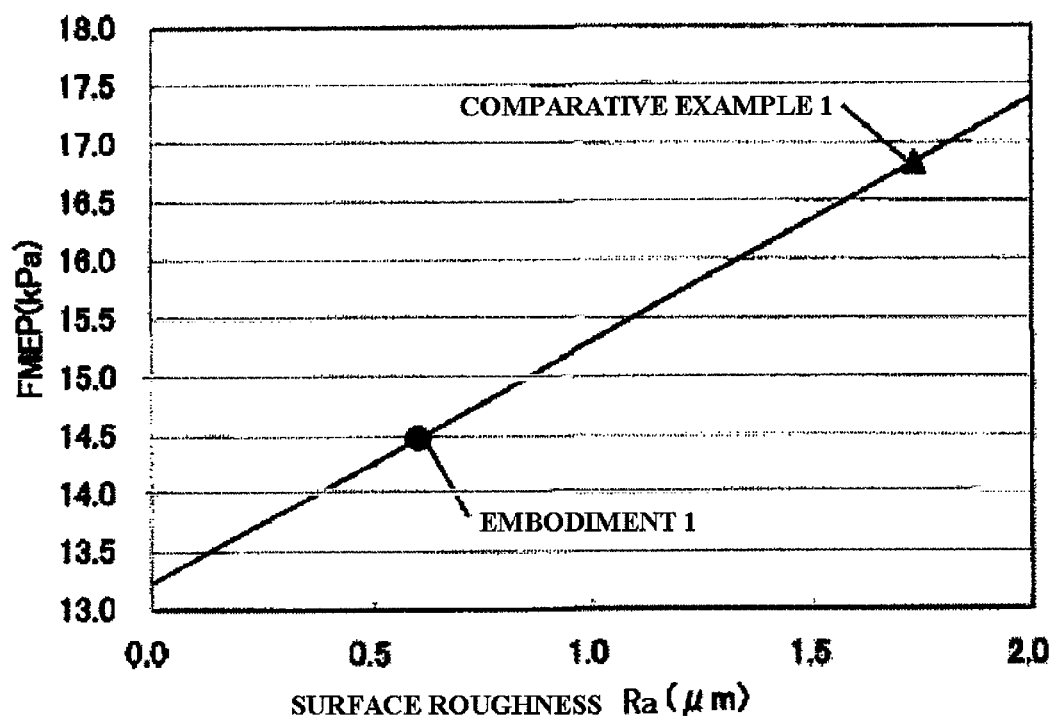
FIG. 9 is a graph showing the measurement results of surface roughness and friction mean effective pressure.
Figure 10A:
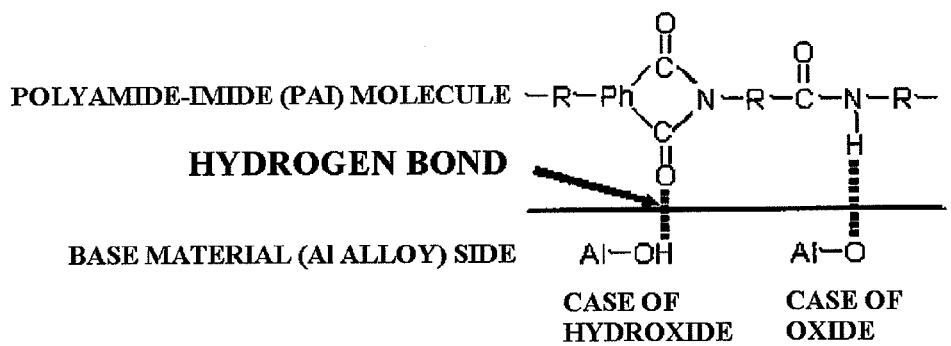
FIGS. 10A and 10B are explanatory diagrams of physicochemical bonds wherein FIG. 10A describes a hydrogen bond, and FIG. 10B describes a van der Waals bond.
Figure 10B:
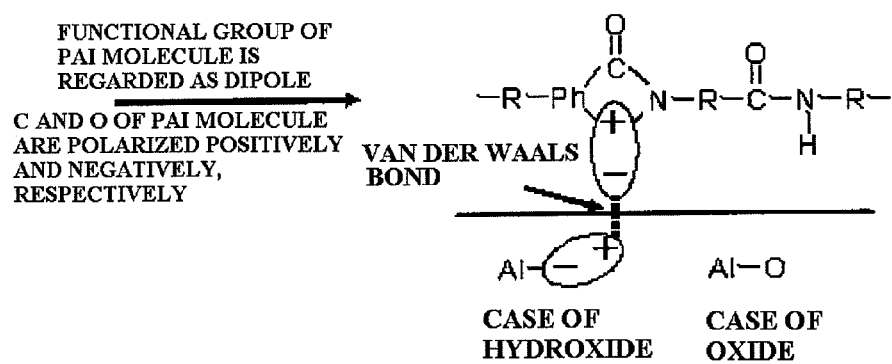

In addition, FIG. 9 shows the above measurement results for Embodiment 1 and Comparative Example 1 plotted in a graph whose vertical axis is the friction mean effective pressure (FMEP) and whose horizontal axis is the surface roughness (Ra).

The surface roughness of the lubrication layer formed on each piston skirt portion can be suppressed to Ra of 1.0 μm or less by the surface treatment according to the method of the present invention. Therefore, by assuming that the friction mean effective pressure (FMEP) varies with the change in the surface roughness (Ra) along the straight line passing through the two plots shown in FIG. 9, it is seen that a friction reducing effect can be obtained in any of the pistons subjected to the surface treatment according to the method of the present invention, compared with the piston in which the lubrication layer was directly formed on the skirt portion (Comparative Example 1).

Thus the broadest claims that follow are not directed to a machine that is configured in a specific way. Instead, the broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Additionally although individual features may be included in different claims, these may possibly be advantageously combined and the inclusion in different claims does not imply that a combination of features is not feasible and/or advantageous. In further addition singular references do not exclude a plurality. Thus references to "a", "an", "first", "second" etc. do not preclude a plurality.

What is claimed is:

1. A method for surface treatment of a skirt portion of a piston for an internal combustion engine, the method comprising:

performing base treatment by injecting metal or ceramic fine particles having an average particle diameter of 20 μm to 400 μm with compressed air or compressed nitrogen as a mixture fluid onto the skirt portion of the piston for the internal combustion engine, made of an aluminum alloy, at an injection speed of 80 m/s or more or an injection pressure of 0.2 MPa or more to be collided with the skirt portion, thereby uniformly making a microstructure of a base material of the piston fine-grained in a depth range of 1 μm to 15 μm from a surface of the skirt portion and forming a modified layer with an activated surface; and forming a lubrication layer composed of a resin coating with a low friction coefficient on the surface of the skirt portion after the base treatment, while a newly generated face is exposed at a surface of the modified layer and is being activated.

2. A method for surface treatment of a skirt portion of a piston for an internal combustion engine, the method comprising:

performing base treatment for forming a modified layer by injecting metal or ceramic fine particles having an average particle diameter of 20 μm to 400 μm with compressed air or compressed nitrogen as a mixture fluid onto a skirt portion of the piston for the internal combustion engine, made of an aluminum alloy, at an injection speed of 80 m/s or more or an injection pressure of 0.2 MPa or more to be collided with the skirt portion, thereby uniformly making a microstructure of a base material of the piston fine-grained in a depth range of 1 μm to 15 μm from a surface of the skirt portion and for forming a metal oxide layer with an activated surface by injecting fine particles containing elemental Sn, Zn, or Zr and having an average diameter of 20 μm to 400 μm with compressed air or compressed nitrogen as a mixture fluid onto the skirt portion provided with the modified layer at an injection speed of 80 m/s or more or an injection pressure of 0.2 MPa or more to be collided with the skirt portion, thereby allowing the elemental Sn, Zn, or Zr to diffuse and penetrate into the modified layer and to be oxidized; and forming a lubrication layer composed of a resin coating with a low friction coefficient on the surface of the skirt portion after the base treatment, while the metal oxide layer is being activated.

3. The method for surface treatment of a skirt portion of a piston for an internal combustion engine according to claim 1, wherein the aluminum alloy is an Al—Si-based alloy, and the modified layer in which the microstructure is made fine-grained such that the Si component in the base material is uniformly distributed is formed.

4. The method for surface treatment of a skirt portion of a piston for an internal combustion engine according to claim 2, wherein the aluminum alloy is an Al—Si-based alloy, and the modified layer in which the microstructure is made fine-grained such that the Si component in the base material is uniformly distributed is formed.

5. The method for surface treatment of a skirt portion of a piston for an internal combustion engine according to claim 1, wherein the lubrication layer is formed within three hours after the base treatment.

6. The method for surface treatment of a skirt portion of a piston for an internal combustion engine according to claim 2, wherein the lubrication layer is formed within three hours after the base treatment.

7. A piston for an internal combustion engine, the piston comprising:

a modified layer formed by injecting metal or ceramic fine particles having an average particle diameter of 20 μm to 400 μm with compressed air or compressed nitrogen as a mixture fluid onto a skirt portion of the piston for the internal combustion engine, made of an aluminum alloy, at an injection speed of 80 m/s or more or an injection pressure of 0.2 MPa or more to be collided with the skirt portion, thereby uniformly making a microstructure of a base material of the piston fine-grained in a depth range of 1 μm to 15 μm from a surface of the skirt portion; and a lubrication layer composed of a resin coating with a low friction coefficient formed on the surface of the skirt portion, while a surface of the modified layer is being activated.

8. A piston for an internal combustion engine, the piston comprising:

a modified layer formed by injecting metal or ceramic fine particles having an average particle diameter of 20 μm to 400 μm with compressed air or compressed nitrogen as a mixture fluid onto a skirt portion of the piston for the internal combustion engine, made of an aluminum alloy, at an injection speed of 80 m/s or more or an injection pressure of 0.2 MPa or more to be collided with the skirt portion, thereby uniformly making a microstructure of a base material of the piston fine-grained in a depth range of 1 μm to 15 μm from a surface of the skirt portion;

a metal oxide layer with an activated surface formed by injecting fine particles containing elemental Sn, Zn, or Zr and having an average diameter of 20 μm to 400 μm with compressed air or compressed nitrogen as a mixture fluid onto the skirt portion provided with the modified layer at an injection speed of 80 m/s or more or an injection pressure of 0.2 MPa or more to be collided with the skirt portion, thereby allowing the elemental Sn, Zn, or Zr to diffuse and penetrate into the modified layer and to be oxidized; and a lubrication layer composed of a resin coating with a low friction coefficient formed on the surface of the skirt portion after the formation of the metal oxide layer, while a surface of the metal oxide layer is being activated.

9. The piston for an internal combustion engine according to claim 7, wherein the aluminum alloy is an Al—Si-based alloy, and the microstructure is made fine-grained such that the Si component in the base material is uniformly distributed in the modified layer.

10. The piston for an internal combustion engine according to claim 8, wherein the aluminum alloy is an Al—Si-based alloy, and the microstructure is made fine-grained such that the Si component in the base material is uniformly distributed in the modified layer.

11. The method for surface treatment of a skirt portion of a piston for an internal combustion engine according to claim 2, wherein the microstructure near an interface with the lubrication layer is uniformly made fine-grained by forming the modified layer before the formation of the lubrication layer or by forming the metal oxide layer, and a region from which peeling starts is eliminated by uniformizing adhesive property of the lubrication layer with respect to the modified layer or the metal oxide layer by uniformizing a distribution of a segregated alloy component.

12. The method for surface treatment of a skirt portion of a piston for an internal combustion engine according to claim 2, wherein a surface roughness of a surface of the modified layer or the metal oxide layer formed on the surface of the skirt portion is set to Ra of 0.5 μm to 2.5 μm, and a resin for forming the lubrication layer is applied on the surface of the skirt portion thereby absorbs the surface roughness so that the lubrication layer has a smooth surface with a surface roughness Ra of 1.0 μm or less.

13. The piston for an internal combustion engine according to claim 8, wherein a surface of the modified layer or the metal oxide layer formed on the surface of the skirt portion has a surface roughness Ra of 0.5 μm to 2.5 μm, and a resin for forming the lubrication layer is applied on the surface of the skirt portion thereby absorbs the surface roughness so that the lubrication layer has a smooth surface with a surface roughness Ra of 1.0 μm or less.

14. The piston for an internal combustion engine according to claim 7, wherein the skirt portion of the piston has a friction mean effective pressure of about 14.5 kPa.

* * * * *